Oct. 7, 1924.
A. CLEVEN
1,511,026
ADJUSTABLE TENSIONING DEVICE
Filed Sept. 28, 1923
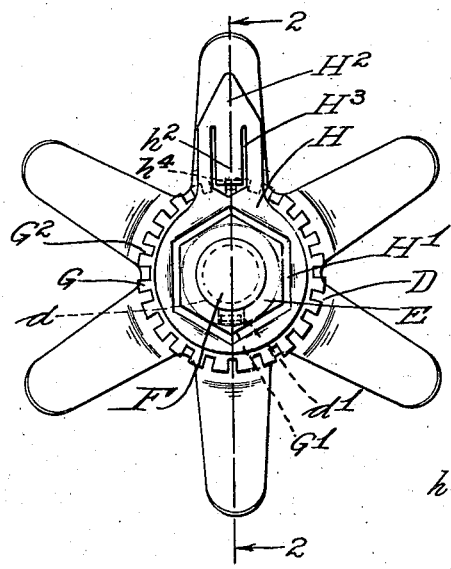
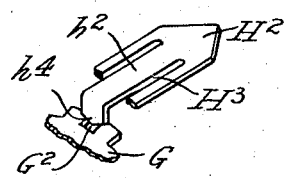
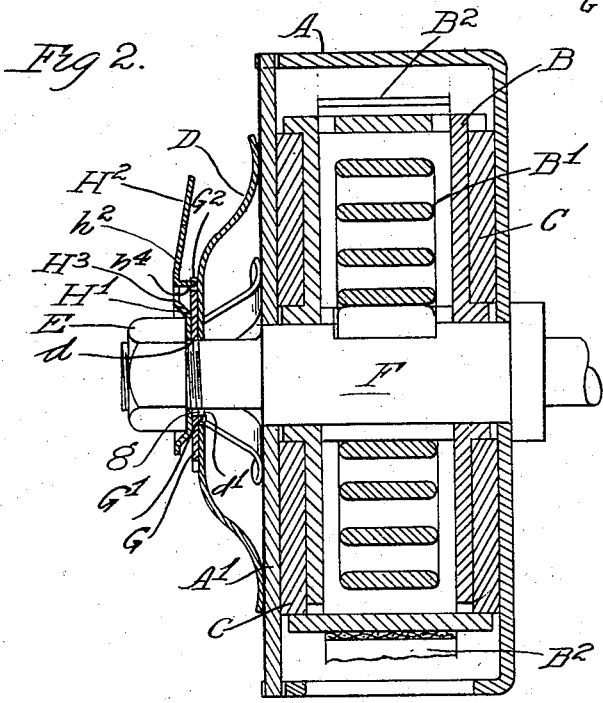
INVENTOR.
Axel Cleven
by Burton & Burton
his ATTORNEYS
Witness Patented Oct. 7, 1924.

1,511,026

UNITED STATES PATENT OFFICE.

AXEL CLEVEN, OF CHICAGO, ILLINOIS, ASSIGNOR TO STEWART-WARNER SPEEDOMETER CORPORATION, OF CHICAGO, ILLINOIS, A CORPORATION OF VIRGINIA.

ADJUSTABLE TENSIONING DEVICE.

Application filed September 28, 1923. Serial No. 665,488.

*To all whom it may concern:*

Be it known that I, AXEL CLEVEN, a citizen of the United States, residing in the city of Chicago, in the county of Cook and the State of Illinois, have invented certain new and useful Improvements in Adjustable Tensioning Devices, of which the following is a specification, reference being had to the accompanying drawings, forming a part thereof.

The purpose of this invention is to provide an improved construction in a device for adjustably tensioning a spring reacting between a fixed part and the tensioning means, particularly designed and adapted for adjusting the tension of a disk or starshaped spring such as is commonly employed for variable pressure to produce lateral friction for braking a rotating wheel. It consists in the elements and features of construction shown and described as indicated in the claim.

In the drawings:—

Figure 1 is a side elevation of a portion of a shock absorber or rebound check for motor vehicles equipped with this invention, for adjusting the tension of rebound retarding brake.

Figure 2 is a detail section at the line 2—2 on Figure 1.

Figure 3 is a detail perspective view showing a detent.

In the construction shown in the drawings, A and B are the opposite side members of the casing of the rebound check device which comprises a rotatable drum or spring enclosing enclosure, B, within the casing between the lateral friction disks, C—C, which are yieldingly pressed against the drum, B, for frictional retardment of the rotation of said drum, which rotation is caused in the descent and rebound of the vehicles due to irregularities in the roadway, by means not fully shown, but usually comprising a spring, $B^1$, within the drum attached at its ends respectively to the axial bolt, hereinafter mentioned, and to the drum, and a strap, $B^2$, attached to the periphery of the drum and wrapped thereabout. It will be understood that the features of construction of the shock absorber as thus far described constitute no part of the present invention.

The yielding pressure indicated is afforded by the star-shaped spring, D, outside the casing, reacting between the casing wall, A, and the nut, E, on the axial bolt, F, which extends through the casing and is stopped by its head, F, against the outside of the case member, $A^1$. The present invention is concerned with the means for locking the nut with respect to the bolt for holding the tension as it may be adjusted. The means for such locking will now be described.

The spring disk, D, has its central aperture, $d$, through which the bolt, F, extends, provided with a notch, $d^1$, for engagement of a tang, $G^1$, struck and folded laterally out of the central opening, $g$, of a washer, G, which is lodged on the bolt outside the spring disk, as seen in Figure 2. The washer, G, is peripherally notched and toothed as seen at $G^2$, and a second washer, H, centrally apertured for passing onto the bolt outside the washer, G, is annularly and hexagonally dished as seen at $H^1$, for accommodating and engaging the nut, E. This second washer has a rotatable arm or handle, $H^2$, from which there is struck a spring finger, $h^2$, severed at its inner end and at its sides as seen at $H^3$, and remaining unsevered at its other end, said finger having its inner free end bent laterally with respect to the plane of the washer, forming a tooth, $h^4$, which is beveled at both corners to an apex, as seen at $h^5$. Said spring finger is positioned to overhang the annular notched and toothed zone, $G^1$, of the washer, G, the bevel-end tooth, $h^4$, being adapted to ride on the teeth and engage the notches of the washer, G, as the nut is rotated on the bolt for varying the tension of the spring disk.

The operation of the device for locking the nut as adjusted on the bolt will be understood from the foregoing description of the structure.

I claim:—

An adjustable tensioning device, in combination with a spring element to be tensioned and the part against which it is lodged for reaction thereon, consisting of a threaded member mounted in and protruding from said part and through the spring element; a washer circularly notched and applied on the threaded element outside the spring element and engaged with the latter against relative rotation of said two engaged parts; a nut on the threaded element and a locking member centrally apertured for the threaded element and countersunk around said aperture non-circularly for seating and engaging the nut, said locking member having a spring tooth struck out from it for engaging the notches of the washer.

In testimony whereof, I have hereunto set my hand at Chicago, Illinois, this 8 day of September, 1923.

AXEL CLEVEN.